United States Patent [19]
Edelson

[11] 3,739,233
[45] June 12, 1973

[54] ELECTRONIC COMBINATION LOCK

[76] Inventor: Andrew C. Edelson, 10832 Charnock Road, Los Angeles, Calif. 90034

[22] Filed: May 26, 1972

[21] Appl. No.: 257,108

[52] U.S. Cl. ....... 317/134, 307/252 K, 317/148.5 B
[51] Int. Cl. ............ E05b 49/00
[58] Field of Search ............ 317/134, 148.5B; 307/246, 252 K, 296, 10 AT, 115; 328/97, 10 G; 70/278

[56] References Cited

UNITED STATES PATENTS

| | | | |
|---|---|---|---|
| 3,611,287 | 10/1971 | Hoff et al. | 307/10 AT |
| 3,644,790 | 2/1972 | Kozlovic et al. | 317/148.5 B |
| 3,587,484 | 6/1971 | Munton | 317/134 |
| 3,192,448 | 6/1965 | Hevenor | 317/134 |

*Primary Examiner*—J. D. Miller
*Assistant Examiner*—Harry E. Mosse, Jr.
*Attorney*—C. A. Miketta, W. W. Glenny, G. P. Smith et al.

[57] ABSTRACT

An electronic combination lock in which a plurality of silicon controlled rectifier (SCR) circuit stages are interconnected by a plurality of manually operable push button switches such that each of the serial stages starting with a first SCR circuit stage must be triggered to a conducting state before a succeeding SCR circuit stage is enabled for triggering. A final and output circuit stage serves as an output lock control means for unlocking a secured area. Thus, a preselected operating sequence of the push button switches is required in order to activate the lock control. Trial and error attempts to break the code are hindered by a plurality of additional push button switches connected to drive each of the SCR circuit stages to their non-triggered or normal condition thereby scrambling the lock and requiring a new application of the entire combination sequence.

19 Claims, 2 Drawing Figures

ELECTRONIC COMBINATION LOCK

Figures 1, 2:
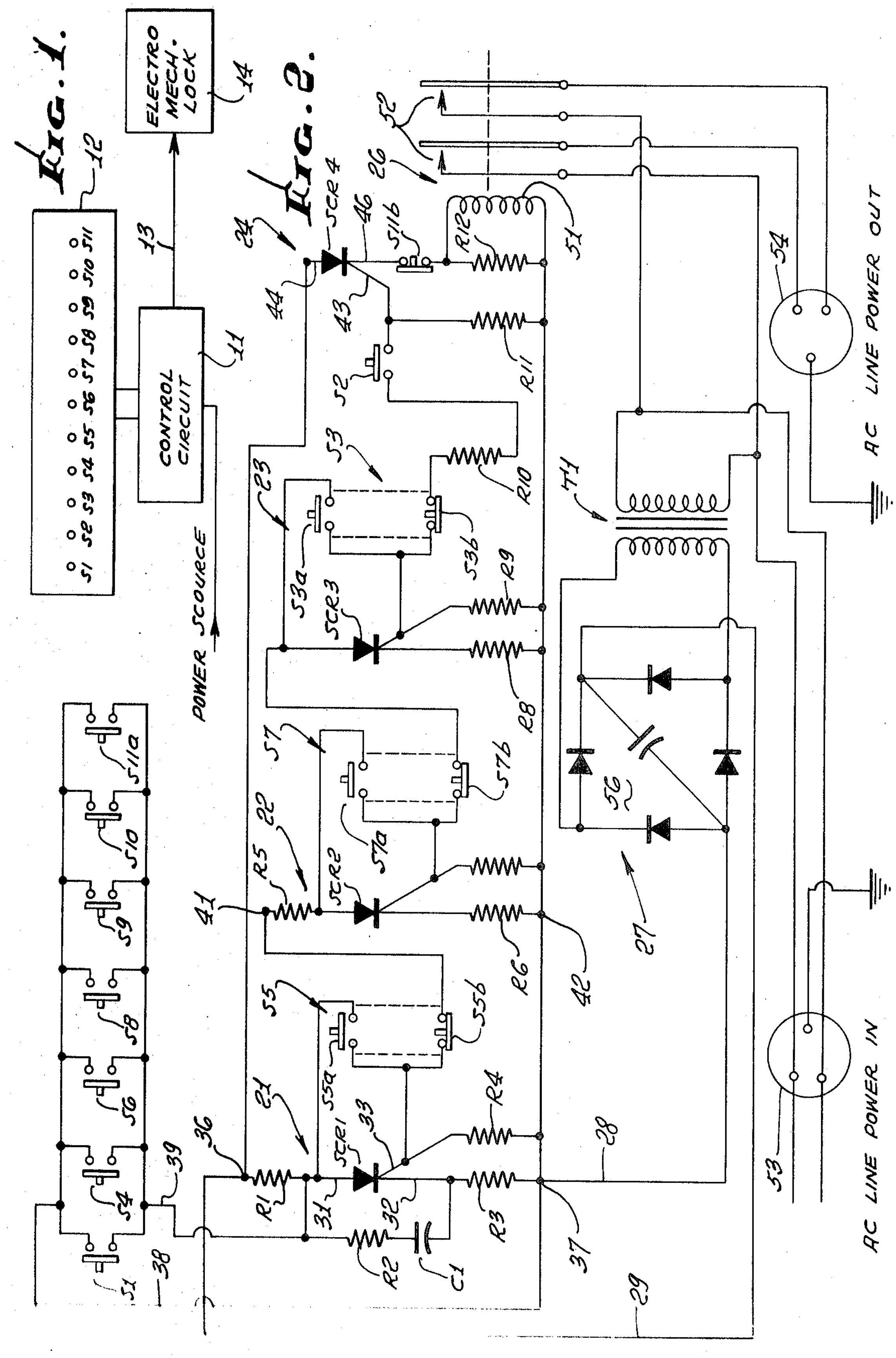

In general, the present invention relates to security control devices and more particularly to an electronic combination lock wherein the combination code is provided by electronic circuitry rather than mechanical means.

Electronic combination locks are in general known and have found wide acceptance in a number of applications. This acceptance is due, at least in part, to the adaptability of electronic lock controls for securing electrical and electromechanical equipment in which the mode of control is primarily or purely electrical rather than mechanical. Furthermore, combination encoding is easily achieved in the electronic circuitry such that the cost of construction of electronic combination locks is by and large less expensive than the mechanical versions.

Notwithstanding the generally accepted utility of electronic locks, circuits which have been heretofore developed for this purpose do not provide the optimum in simplicity, reliability and low manufacturing cost. These characteristics are necessary in order to insure the commercial viability of electronic combination locks for a broad range of uses. Accordingly, it is an object of the present invention to provide an electronic combination lock circuit exhibiting simplicity of design and employing a minimum number of components to permit low cost mass manufacture.

It is a further object of the present invention to provide a lower cost electronic combination lock having a circuit construction which is inherently reliable. It is anticipated that large volume commercialization of such locks requires that the circuitry be mounted in a relatively small package, perhaps encapsulated, such that servicing of these devices is virtually eliminated.

Another object of the present invention is to provide such a low cost and reliable electronic combination lock having many of the security features found only in more expensive and complex electronic circuits. Such security features include sequential operation of the manual code entry means, in this instance, provided by manually operated push button switches. False key detection by which a false or out of sequence actuation of one of the push buttons results in scrambling of the electrical condition of the circuit, thereby erasing any prior and fortuitous entry of a partial correct code.

These and other objects and various advantages of the electronic combination lock constructed in accordance with the present invention will become apparent to those skilled in the art from a consideration of the following detailed description of an exemplary embodiment thereof. Reference will be made to the appended sheets of drawings in which:

FIG. 1 is a generalized block diagram illustrating the basic components of the electronic lock of the present invention; and FIG. 2 is a detailed schematic diagram showing the construction of the lock illustrated generally by FIG. 1.

With reference to FIG. 1, the present invention provides an electronic control circuit 11 responsive to entry of a proper combination code at a panel 12 carrying a plurality of manually operable push button switches to connect a source of power to an output 13 of circuit 11. This controlled power source at output 13 may be employed to operate an electrical appliance, a power tool, or as in this instance, an electromechanical lock 14 controlling access to a secured area. In accordance with the present invention as best illustrated by FIG. 2, panel 12 carries a plurality of manually operable push button switches of the momentary contact type in the form of S 1 – S 11. These push button switches serve to selectively operate a plurality of silicon controlled rectifier (SCR) circuit stages 21, 22, 23 and 24 which are serially interconnected by certain of the switching means S1–S11 to provide a desired combination and sequence of stage actuation. A final SCR circuit stage 24 of the series provides an output stage for operating an output lock control means in this instance in the form of a relay 26 as illustrated.

Each of the stages 21, 22, 23 and 24 includes an SCR device, here in the form of SCR1, SCR2, SCR3 and SCR4 respectively, connected in each circuit stage such that it may be triggered from a normal quiescent non-conducting state in the anode-cathode circuit to a triggered or conducting state. Moreover, each of the intermediate circuit stages, namely stages 22 and 23 in this instance are serially connected to receive electrical power from a preceding stage through certain of the switches, in this instance switches S5 and S7 as illustrated. The SCR device of output stage 24 is connected through switches S2 and S3 to the immediately preceding intermediate stage 23 such that SCR4 of stage 24 can be triggered only if the preceding stage 23 has previously assumed its triggered or conducting state. It is observed that stages 21–24 are thus serially cascaded in such a manner that each of the stages must be triggered to its conducting state in sequence starting with a first stage 21 and continuing through the output stage 24 by appropriate sequential operation of push button switches S5, S7, S3 and S2. Manual entry of the combination code in this manner on panel 12 will result in operation of control circuit 11 and more particularly operation of relay 26 so as to energize output 13 of FIG. 1. The order in which switches S2, S3, S5 and S7 are arranged on panel 12 may be varied for each installation, merely by altering the location of the switches themselves while maintaining the same numerical sequence as shown on panel 11.

With further reference to FIG. 2, the first and output stages 21 and 24 are adapted for connection across a source of power, here in the form of power supply 27, providing a minus DC reference voltage, –V, and a positive DC reference voltage, +V, which in the present embodiment correspond to –6 volts and +6 volts DC. These connections to power supply 27 are provided over lines 28 and 29 as illustrated such that the first stage SCR device is always provided with electrical power and it may be triggered at any time to its conducting state. Similarly, SCR4 of output stage 24 is permanently provided with a source of power over lines 28 and 29. On the other hand, and as discussed above, intermediate stages 22 and 23 derive their electrical power from the first stage and in turn from each preceding stage through the various switching means such that if the SCR device of stage 21 while in its conducting state and providing power to the succeeding stages is driven to its non-conducting state then power to intermediate stages 22 and 23 is terminated.

Each of the SCR devices of stages 21–24 has an anode, cathode and gate as illustrated by anode 31, cathode 32 and gate 33 of SCR1. First stage device SCR1 has its anode 31 and cathode 32 connected in a series circuit including a load resistor R1 and a cathode load resistor R3 respectively adjacent end terminals 36 and 37. This series circuit is connected across the source of power provided by supply 27 with terminal 36 being connected to the positive reference voltage +V and terminal 37 being connected to the minus reference voltage through a gate resistor R4 which serves to eliminate inadvertent triggering of the SCR by spurious voltage spikes occurring in the circuit. Resistor R3 provides a load for its conducting state.

One of the switching means interconnecting the various stages, namely switch S5 is associated with the first stage and has a pair of noramlly open contacts S5a respectively connected to the anode and gate of SCR1 to provide contact means for triggering SCR1 to its conducting state by connecting the voltage at anode 31 to gate 33. This same switch also has a pair of normally closed contacts S5*b* connected respectively to gate 33 of the first stage SCR device and to the anode of the SCR device in the succeeding stage 22. In this instance a resistor R5 is serially interposed between contacts S5*b* and the anode of SCR2 to provide a current limiting resistance in this serial path. Normally closed contacts S5b thus provide means for communicating the voltage at gate 33 of SCR1 to the anode of SCR2 of the succeeding and intermediate stage 22 and thus for selectively connecting power from first stage to succeeding stage 22. Switches S7 and S3 are similarly associated with stages 22 and 23 respectively.

In addition to the switching means interconnecting stages 21–24, an additional plurality of switching means are provided in panel 12 for scrambling control circuit 11 in the event a partial combination code is correctly albeit fortuitously entered in the circuit by an unauthorized person. Particularly, scramble switches S1, S4, S6, S8, S9, S10 and S11a provide such false key detection if any one of these switches is operated during entry of the proper code. As illustrated, push button switches S1, S4, S6, S8, S9, S10 are single pole, single throw devices with switch S11a being one pole of switch S11 and each having normally open contacts connected in parallel over connection lines 38 and 39 extended so as to provide means for selectively returning the device to its quiescent and non-conducting state. For this purpose, line 38 is connected to extend the negative reference voltage −V through any one of the scramble switches to line 39 which in turn is connected to anode 31 of SCR1. A capacitive resistive network 41 including capacitor C1 and resistor R2 connected in shunt across the anode and cathode of SCR1 provides for instantaneous and positive turn-off of SCR1. By communicating the negative reference voltage applied by line 39 both to the junction of anode 31 and resistor R2 the capacitor C1 is discharged and negative voltage is applied to cathode 32. A load resistor R1 connected between anode 31 and terminal 36 of the anode-cathode series circuit provides a load resistance between the negative and positive polarities of the power supply 27 during closure of scramble switches S1, S4, S6, S8, S9, S10 and S11a so as to protect the power supply.

In accordance with the preferred embodiment of the present invention, one or more intermediate SCR circuit stages, such as stages 22 and 23, is provided between first stage 21 and output stage 24. With reference to intermediate stage 22, each intermediate stage SCR device, in this instance SCR2 is provided with an anode-cathode series circuit, in this instance including current limiting resistor R5 and cathode load resistor R6 and having end terminals 41 and 42. Terminal 42 adjacent the cathode of SCR2 is connected to the end terminal 37 adjacent the cathode of the first stage device such that the cathode circuits are jointly connected by the negative polarity reference voltage −V. The end terminal 41 adjacent the anode of SCR2 is connected to the switching means associated with the first stage, in this instance, the normally closed contacts S5b of switch S5.

Furthermore, each intermediate stage has an associated switching means, for example, switch S7 is associated with intermediate state 22 and switch S3 is associated with intermediate stage 23, wherein each associated switch is provided with normally open contacts S7*a* and S3*a* for selectively connecting the anode to the gate of the same associated SCR device and normally closed contacts S7*b* and S3*b* for selectively connecting the respective gates to the succeeding stage. In the case of each intermediate stage, except that stage immediately preceding output stage 24, the normally closed contacts of the associated switching means are connected between the gate of the associated stage device and the anode of the succeeding stage device as shown by contacts S7b connecting the gate of SCR2 to the anode of SCR3. This provides the previously discussed serial transfer of the electrical power from the first stage to the second stage, etc. as each preceding stage is triggered to its conducting state. It is observed that the gate 33 of SCR1 and the gates of SCR2 and SCR3 are at reference voltage −V during the non-conducting states of the respective SCR devices. When each of the devices is triggered to its conducting state in sequence, the gate voltage becomes positive by reason of current flow through the SCRs. Thus the voltage at the various gates becomes positive thereby providing a source of positive voltage at the anodes of the intermediate stage devices.

SCR3 of stage 23 is triggered to its conducting state by the normally open contacts S3*a* of its associated switch S3 and thus functions in the same manner as intermediate stage switch except in the following respect. In the case of the intermediate stage immediately preceding the output stage, the normally closed contacts, in this instance, contacts S3*b* of the associated switch are connected from the gate of the associated SCR device to the gate of the output stage device in this instance gate 43 of SCR4 as illustrated. Furthermore in the preferred form of the invention one of switches S1 through S11, in this instance, S2, is connected in series between the switching means associated with stage 23 and gate 43 of SCR4 to trigger the output stage SCR device only after the preceding SCR circuit stage has been disposed in its conducting state. Thus, switch S2 is a single pole single throw switch having normally open contacts, one of which is connected to gate 43 and the other of which is connected through a current limiting resistor R10 to the normally closed contact S3*b* of switch S3.

In this manner, SCR4 having its anode and cathode 44 and 46 respectively connected in a series circuit including a switch S11b and a cathode load resistor R12 across power supply 27 via lines 28 and 29 is triggerable to its conducting or actuated state in response to momentary closure of the S2 switch contacts communicating the positive gate voltage of SCR3 while in its conducting state to the gate 43 of device SCR4. A gate resistor R11 together with cathode resistor R12 complete the circuit stage and enable SCR4 to be switched between a stable non-conducting mode and a stable conducting mode. It is also observed that resistor R11 and the other gate resistors, in the same manner as resistor R4, R7 and R9 protect the various SCR devices from inadvertent triggering by spurious voltage spikes occurring in the circuitry.

In order to deactivate the lock control means, in this instance in the form of relay 26, and restore the circuitry to its initial and normal condition, an output disable and scramble switch S11 is provided having a separate set of normally closed contacts S11b connected in series with the anode-cathode series circuit of the SCR device of output stage 24. In this instance, contacts S11b are serially connected between cathode 46 of SCR4 and resistor R12 as illustrated such that in response to momentary opening of these contacts current flow in the anode-cathode path of SCR4 is interrupted thereby forcing the device to reassume its normal non-conducting state. In this manner, output stage 24 is disabled. Simultaneously with this operation another portion of switch S11, namely normally open contacts S11a connected as a scramble switch in parallel with S1, S4, S6, S8, S9 and S10 serves to drive the SCR device of the first stage 21 to its non-conducting state as described above. In this manner, the entire circuitry is scrambled, i.e., each of the stages are returned to their normal non-conducting states so as to respond to a subsequent entry of the predetermined code.

Switch S11 is provided by a push button manually operated momentary contact device having a double pole double throw configuration. Switches S1, S2, S4, S6, S8, S9 and S10 are here in the form of single pole, single throw push button operated, normally open momentary contact devices. Switches S3, S5 and S7 are push button operated momentary contact types having a single pole double throw configuration. In this instance, the single pole of each of switches S3, S5 and S7 is preferably connected as shown to the gate of each of the associated SCR devices such that the normally open and normally closed contact portions of these various switches provides for mutually exclusive connection of the gate either to the anode of the same device through the normally open contacts or to a succeeding stage through the normally closed contacts. In this respect, it is observed that it is possible to use the voltage at the gate of each SCR device for energizing the succeeding stage because of the minimal power drain on the gate circuit. In this manner, circuitry wiring is minimized and the manufacturing cost reduced. However, it will be appreciated that switches S3, S5 and S7 can be formed with an additional pole providing separate connection of the normally closed contacts to the associated stage such that these normally closed contacts could be connected to the cathode of each SCR device rather than the gate for energizing the succeeding stage.

Relay 26 providing an output lock control means includes a relay coil 51 connected to be energized by the output stage 24 in this instance by means of a connection of coil 51 across resistor R12 in the anode-cathode series circuit of device SCR4. Normally open contacts 52 of relay 26 provides for controlled connection between a power source in this instance provided by an AC line power via plug 53 to an output 13 of the combination lock in this instance in the form of an AC line power out receptacle 54. Power supply 27 while here in the form of a diode rectification circuit 56 connected across the secondary winding of a step-down transformer T1 having its primary jointly connected to AC plug 53 along with contacts 52 of relay 26, may alternatively be provided by a voltage battery source. In such case the electronic combination lock of the present invention may be installed at locations where an AC line source is either inaccessible or inconvenient for powering the circuitry.

In accordance with the foregoing disclosure, the electronic combination lock of the present invention provides over 3.5 million possible combinations, such that it is virtually impossible to open the lock without prior knowledge of the actual code. In this instance, the proper code is 5 7 3 2 in that order on panel 12 corresponding to switches S5, S7, S3 and S2. Additional combinations may be provided by adding additional imtermediate SCR circuit stages, such as stage 22 and providing additional associated switches like switch S7. This would increase the combination code necessary to open the lock. Further unsuccessful combinations can be added to the lock merely by increasing the number of scramble switches S1, S4, S6, S8, S9 and S10.

Once the lock control means connected to output stage 24 is energized, only switch S11 will de-energize the output stage and scramble the lock. Thus, in use and after the proper code has been inserted and relay 26 actuated to control the power to plug 54, the lock may be restored to its secured state by pressing switch S11 which disables output stage 24 and scrambles the remaining stages.

The uses of a combination lock constructed in accordance with the foregoing disclosure are many and varied. One major use is for a safety lock for electrical appliances and power tools. In such case, the appliances or power tools may be plugged into receptacle 54 with plug 53 being powered by household AC current such that power to the appliance or tool is controlled by entry of the proper combination on panel 12. The lock panel and control circuit can be housed in a suitable enclosure and attached to the appliance or tool at a convenient location. Such a device would provide an important safety factor to insure that unauthorized persons, as well as children at play, do not activate the appliance or tool to their injury.

Other applications can prevent unauthorized personnel from using various types of equipment in a business office or industrial plant, such as typewriters, adding machines, copiers, machinery, etc. Another use would be to prevent unauthorized personnel from access to and use of expensive computer time.

The lock is also employable in the automotive field as a combination ignition switch thereby eliminating the need for or supplementing the use of car keys. Similarly, the lock could be used for boats and their ignition switches.

In this regard, it is observed that although the present embodiment provides a relay 26 connected to the output stage 24 and controlling a source of AC power by means of contacts 52, relay 26 could easily be replaced by various types of switching devices such as an ignition switch or electro-mechanical actuator. For example, a combination sol noid and mechanical lock could be connected in lieu of relay 26 for direct operation of the lock control means 14 of FIG. 1 by output stage 24.

I claim:

1. An electronic combination lock, comprising:

a plurality of manually operable switching means;

a plurality of SCR circuit stages adapted for connection to a source of electrical power and each having an SCR device capable of being triggered from a normal non-conducting state to a conducting state, certain of said switching means connecting said stages in series for manual selective sequential triggering of each SCR device to its conducting state only if the device of the preceding stage is in its conducting state starting with a first serial stage and culminating with an output stage;

said first stage SCR device having an anode and cathode and gate, said anode and cathode connected in a series circuit having end terminals adapted for connection across the source of electrical power having plus and minus polarities, one of said certain switching means being associated with the first stage and having contact means connected to said gate for triggering of said first stage device and connection of said first stage device to an anode of a succeeding stage SCR device; and output lock control means connected to said output stage and responsive to the state of the SCR device thereof such that predetermined sequential manual operation of said switch means actuates said lock control means.

2. The electronic lock of claim 1 further defined by at least one of said switching means other than said certain switching means having a scramble switch including connection means extending to said first stage for driving the SCR device thereof to its non-conducting state.

3. The electronic lock of claim 1 at least one intermediate SCR circuit stage connected between said first and output stages, the intermediate stage SCR device having an anode and cathode and gate, said anode and cathode connected in a series circuit having end terminals with the terminal adjacent said cathode connected to the terminal of the first stage series circuit adjacent its cathode and with the terminal end adjacent said intermediate stage anode connected to the contact means of said switching means associated with the first stage.

4. An electronic combination lock, comprising:

a plurality of manually operable switching means;

a plurality of SCR circuit stages adapted for connection to a source of electrical power and each having an SCR device capable of being triggered from a normal non-conducting state to a conducting state, certain of said switching means connecting said stages in series for manual selective sequential triggering of each SCR device to its conducting state only if the device of the preceding stage is in its conducting state starting with a first serial stage and culminating with an output stage;

said first stage SCR device having an anode and cathode and gate, said anode and cathode connected in a series circuit having end terminals adapted for connection across a source of electrical power, one of said certain switching means being associated with the first stage and having normally open contacts connected for connection between said anode and gate to trigger said SCR device and having normally closed contacts the gate of said first stage SCR device to the anode of the succeeding stage SCR device connecting to enable triggering thereof.

5. The electronic lock of claim 4, further defined by at least one of said switching means other than said certain switching means having a scramble switch including normally open contacts connected to said anode and a capacitive-resistive network of said first stage for selectively returning said first stage SCR device to its non-conducting state.

6. The electronic lock of claim 5, wherein said capacitive-resistive network is connected in shunt across the anode and cathode of the first stage SCR device and said scramble switch having one of its normally open contacts connected to said anode and said network and the other contact connected to said minus polarity end terminal.

7. The electronic lock of claim 6, said anode-cathode series circuit comprising a load resistor connected between said anode and the adjacent end terminal for providing an impedance load across the source of power when said scramble switch contacts are closed.

8. The electronic lock of claim 4, at least one intermediate SCR circuit stage connected between said first and output stages, the intermediate stage SCR device having an anode and cathode and gate, said anode and cathode connected in a series circuit having end terminals with the terminal adjacent said cathode connected to the corrresponding terminal of said first stage series circuit and with the terminal adjacent said intermediate stage anode connected to one of the normally closed contacts of said switching means associate with said first stage, another of said certain switching means being associated with said intermediate stage and having normally open contacts connected for selective connection of the anode to the gate of the intermediate stage SCR device for triggering thereof and having normally closed contacts connecting said intermediate stage to a succeeding serial stage.

9. The electronic lock of claim 8, the switching means associated with said first and intermediate stages having a common pole connected to the gate of the associated SCR device for selective mutually exclusive connection to the anode of the same SCR device through said normally open contacts and to the anode of the SCR device of the succeeding stage through said normally closed contacts.

10. The electronic lock of claim 8, wherein the succeeding stage is another intermediate stage and said last named normally closed contacts connect said intermediate stage to the anode of the succeeding intermediate stage SCR device.

11. The electronic lock of claim 8, wherein the succeeding stage is the output stage, said output stage SCR device having an anode and a cathode and a gate, said anode and cathode connected in a series circuit having end terminals adapted for connection across a source of power, and another of said certain switching means selectively connecting one of said last named normally closed contacts of said intermediate stage switching means to said gate of said output stage for triggering the SCR device thereof.

12. The electronic lock of claim 4, wherein said output stage SCR device has an anode and a cathode and a gate, said anode and cathode connected in a series circuit and such circuit being adapted for connection across a source of electrical power, one of said certain switching means selectively connecting said gate of said output stage device to a preceding stage.

13. The electronic lock of claim 12, another one of said switching means other than said certain switching means connected to said first and output stages for selectively disposing the SCR devices thereof in their non-conducting states.

14. The electronic lock of claim 12, another of said switching means other than said certain switching means being an output disable and scramble switch having normally closed contacts serially connected in said anode-cathode series circuit of said output stage and having normally open contacts extended to and for selectively returning the first stage SCR device to its non-conducting state.

15. The electronic lock of claim 12, said output lock control means having an electrical actuation means connected to said output stage series circuit for actuation in response to said output stage device being in its conducting state.

16. The electronic lock of claim 15, said output lock control means comprising a relay having a coil connected to said output stage series circuit and providing said electrical actuation means, said relay having contact means adapted to be connected to a source of line voltage and output power means connected to contact means for selective connection to the source of line voltage.

17. The electronic lock of claim 4, further comprising power source means, said first and output stages being connected to said power source such that said first stage and each succeeding stage except the stage preceding the output stage selectively extends power from said power source to and for enabling operation of the next succeeding stage.

18. The electronic lock of claim 17, said power source is comprised of a rectification network adapted for connection to an alternating current line, and said output lock means comprises a relay having contact means adapted for connection to said alternating current line and controlled output line means connected to said contact means for controlled connection to said alternating current line.

19. An electronic combination lock, comprising; a plurality of manually operable switching means of the momentary contact type, a plurality of serially cascaded SCR circuit stages each having an SCR device triggerable from a normaly non-conducting state to a conducting state, a source of electrical power, a first and final of said stages connected across said source of power, certain of said switching means being associated with each of said stages and having contact means for extending electrical power from said first stage to each succeeding stage except said final stage to enable triggering thereof and having contact means for selective triggering of each stage device, another of said switching means having contact means connected to said final stage for selectively driving the SCR device thereof to its non-conducting state and having contact means connected to said first stage for selectively driving the SCR device thereof to its non-conducting state and thereby terminating electrical power to the succeeding stages, and output lock control means connected to said final stage and responsive to the state of the SCR device thereof, whereby predetermined sequential manual operation of said switching means actuates said lock control means for opening a lock or the like.

* * * * *